United States Patent
Scheideler et al.

(10) Patent No.: US 11,516,228 B2
(45) Date of Patent: Nov. 29, 2022

(54) SYSTEM AND METHOD FOR SIEM RULE SORTING AND CONDITIONAL EXECUTION

(71) Applicant: KYNDRYL, INC., New York, NY (US)

(72) Inventors: Tim Uwe Scheideler, Schoenenberg (CH); Ivan James Reedman, Cheltenham (GB); Arjun Udupi Raghavendra, Zurich (CH); Matthias Seul, Martinez, CA (US)

(73) Assignee: KYNDRYL, INC., New York, NY (US)

( * ) Notice: Subject to any disclaimer, the term of this patent is extended or adjusted under 35 U.S.C. 154(b) by 786 days.

(21) Appl. No.: 16/424,952

(22) Filed: May 29, 2019

(65) Prior Publication Data

US 2020/0382525 A1 Dec. 3, 2020

(51) Int. Cl.
*H04L 9/40* (2022.01)
*G06F 11/32* (2006.01)

(52) U.S. Cl.
CPC ........ *H04L 63/1416* (2013.01); *G06F 11/327* (2013.01); *H04L 63/0263* (2013.01)

(58) Field of Classification Search
CPC . G06F 11/327; H04L 63/0263; H04L 63/1416
See application file for complete search history.

(56) References Cited

U.S. PATENT DOCUMENTS

| 6,633,835 | B1 | 10/2003 | Moran | |
|---|---|---|---|---|
| 8,418,240 | B2* | 4/2013 | Wool | H04L 63/0263 726/11 |
| 8,819,762 | B2* | 8/2014 | Harrison | H04L 63/20 726/1 |

(Continued)

FOREIGN PATENT DOCUMENTS

| CN | 105404586 A | 3/2016 |
|---|---|---|
| CN | 108243060 A | 7/2018 |

OTHER PUBLICATIONS

Search Query Report from IP.com (performed Mar. 18, 2022) (Year: 2022).*

(Continued)

*Primary Examiner* — Sharon S Lynch
(74) *Attorney, Agent, or Firm* — Erik Swanson; Andrew M. Calderon; Calderon Safran & Cole P.C.

(57) ABSTRACT

A method for processing security events by applying a rule-based alarm scheme may be provided. The method includes generating a rule index of rules and an indicator of compromise index for each of the rules. The method includes also processing the incoming security event by applying the rules, increasing a current rule counter relating to a triggered rule, and increasing a current indicator of compromise counter pertaining to the triggered rule. Furthermore, the method includes generating a pseudo security event from received data about known attacks and related indicators of compromise, processing the pseudo security events by sequentially applying the rules, increasing a current rule counter of pseudo security events, and increasing a current indicator of compromise counter for pseudo security events, and sorting the rules and sorting within each rule the indicator of compromise values in the indicator of compromise index.

23 Claims, 9 Drawing Sheets

(56) References Cited

U.S. PATENT DOCUMENTS

| | | | | |
|---|---|---|---|---|
| 9,537,841 | B2* | 1/2017 | Schütz | H04L 63/06 |
| 9,584,379 | B2 | 2/2017 | Klimov | |
| 9,601,000 | B1* | 3/2017 | Gruss | G06F 21/552 |
| 9,807,109 | B2* | 10/2017 | Laidlaw | G06F 21/577 |
| 9,866,426 | B2* | 1/2018 | Shelton | H04L 41/0631 |
| 9,900,335 | B2* | 2/2018 | Desch | H04L 63/1433 |
| 9,965,627 | B2* | 5/2018 | Ray | G06F 21/552 |
| 9,967,264 | B2* | 5/2018 | Harris | H04L 63/1416 |
| 9,967,282 | B2* | 5/2018 | Thomas | H04L 63/20 |
| 9,967,283 | B2* | 5/2018 | Ray | H04L 63/0263 |
| 9,985,982 | B1* | 5/2018 | Bartos | H04L 63/1425 |
| 9,992,228 | B2* | 6/2018 | Ray | H04L 63/1408 |
| 10,063,373 | B2* | 8/2018 | Schütz | H04L 63/06 |
| 10,122,687 | B2* | 11/2018 | Thomas | H04L 63/10 |
| 10,148,677 | B2* | 12/2018 | Muddu | G06F 16/444 |
| 10,225,286 | B2* | 3/2019 | Ray | H04L 63/1408 |
| 10,382,459 | B2* | 8/2019 | Harris | H04L 63/108 |
| 10,516,531 | B2* | 12/2019 | Schütz | G06F 21/552 |
| 10,558,800 | B2* | 2/2020 | Ray | G06F 21/6218 |
| 10,666,668 | B2* | 5/2020 | Muddu | H04L 43/00 |
| 10,673,902 | B2* | 6/2020 | Thomas | H04L 63/20 |
| 10,728,273 | B1* | 7/2020 | Okubo | H04L 63/0263 |
| 10,778,703 | B2* | 9/2020 | Muddu | H04L 43/062 |
| 10,778,725 | B2* | 9/2020 | Ray | H04L 63/1408 |
| 10,789,367 | B2* | 9/2020 | Joseph Durairaj | G06N 3/0436 |
| 10,798,113 | B2* | 10/2020 | Muddu | H04L 63/1425 |
| 10,841,339 | B2* | 11/2020 | Ray | H04L 63/20 |
| 10,911,468 | B2* | 2/2021 | Muddu | H04L 41/145 |
| 10,965,711 | B2* | 3/2021 | Schiappa | H04L 63/20 |
| 10,986,106 | B2* | 4/2021 | Muddu | H04L 43/00 |
| 11,012,472 | B2* | 5/2021 | Milazzo | H04L 63/1416 |
| 11,057,411 | B2* | 7/2021 | Nakata | G06F 21/567 |
| 11,140,130 | B2* | 10/2021 | Thomas | H04L 63/0263 |
| 2003/0051165 | A1* | 3/2003 | Krishnan | H04L 63/0263 726/4 |
| 2003/0120652 | A1* | 6/2003 | Tifft | G06F 16/2453 |
| 2004/0255151 | A1* | 12/2004 | Mei | H04L 63/20 726/25 |
| 2008/0010225 | A1 | 1/2008 | Gonsalves | |
| 2009/0138938 | A1* | 5/2009 | Harrison | G06F 21/604 726/1 |
| 2009/0172800 | A1* | 7/2009 | Wool | G06F 21/604 726/11 |
| 2013/0227689 | A1 | 8/2013 | Pietrowicz | |
| 2014/0157405 | A1 | 6/2014 | Joll | |
| 2014/0201836 | A1* | 7/2014 | Amsler | H04L 63/20 726/23 |
| 2015/0213358 | A1* | 7/2015 | Shelton | H04L 41/0636 706/47 |
| 2015/0365438 | A1* | 12/2015 | Carver | H04L 41/0816 726/1 |
| 2016/0078225 | A1* | 3/2016 | Ray | G06F 21/552 726/23 |
| 2016/0080399 | A1* | 3/2016 | Harris | H04L 63/1433 726/23 |
| 2016/0080417 | A1* | 3/2016 | Thomas | H04L 63/1416 726/1 |
| 2016/0080418 | A1* | 3/2016 | Ray | H04L 63/1416 726/1 |
| 2016/0080419 | A1* | 3/2016 | Schiappa | H04L 63/1441 726/1 |
| 2016/0080420 | A1* | 3/2016 | Ray | H04L 63/1408 726/1 |
| 2016/0191465 | A1* | 6/2016 | Thomas | H04L 63/0263 726/1 |
| 2016/0191466 | A1* | 6/2016 | Pernicha | H04L 63/20 726/1 |
| 2016/0191476 | A1* | 6/2016 | Schütz | H04L 9/0891 713/165 |
| 2017/0032130 | A1* | 2/2017 | Joseph Durairaj | H04L 41/16 |
| 2017/0078093 | A1* | 3/2017 | Schütz | H04L 9/0891 |
| 2017/0085588 | A1* | 3/2017 | Laidlaw | G06F 21/552 |
| 2017/0116416 | A1* | 4/2017 | Pearcy | G06F 21/562 |
| 2017/0187741 | A1* | 6/2017 | Desch | H04L 63/102 |
| 2017/0223037 | A1* | 8/2017 | Singh | H04L 63/1491 |
| 2017/0286671 | A1 | 10/2017 | Chari | |
| 2018/0234457 | A1 | 8/2018 | Rajkumar | |
| 2018/0276378 | A1* | 9/2018 | Ray | G06F 21/6218 |
| 2018/0278631 | A1* | 9/2018 | Harris | H04L 63/1416 |
| 2018/0278649 | A1* | 9/2018 | Thomas | H04L 63/1416 |
| 2018/0278650 | A1* | 9/2018 | Ray | H04L 63/20 |
| 2018/0324220 | A1* | 11/2018 | Ray | G06F 16/285 |
| 2018/0367299 | A1* | 12/2018 | Schütz | H04L 63/06 |
| 2019/0028438 | A1* | 1/2019 | Thomas | H04L 63/10 |
| 2019/0095599 | A1* | 3/2019 | Iliofotou | G06F 16/337 |
| 2019/0098068 | A1* | 3/2019 | Iliofotou | H04L 67/1002 |
| 2019/0149580 | A1* | 5/2019 | Ray | H04L 63/20 726/1 |
| 2019/0182283 | A1* | 6/2019 | Nakata | H04L 63/1425 |
| 2020/0186569 | A1* | 6/2020 | Milazzo | H04L 63/08 |
| 2020/0327225 | A1* | 10/2020 | Nguyen | G06N 3/084 |
| 2020/0334498 | A1* | 10/2020 | Pan | G06K 9/6257 |
| 2020/0364223 | A1* | 11/2020 | Pal | G06F 9/5016 |
| 2021/0240836 | A1* | 8/2021 | Hazony | G06F 21/554 |
| 2022/0131836 | A1* | 4/2022 | Thomas | H04L 63/10 |

OTHER PUBLICATIONS

Search Query Report from IP.com (performed Jul. 15, 2022) (Year: 2022).*

International Search Report and Written Opinion for International application No. PCT/IB2020/053997, dated Jul. 28, 2020, 7 pages.

Renners et al., "Modeling and Learning Incident Prioritization", The 9th IEEE International Conference on Intelligent Data Acquisition and Advanced Computing Systems: Technology and Applications, Sep. 21-23, 2017, Bucharest, Romania, pp. 398-403.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

400

| Rule counter | IOC1 counter | IOC2 counter | IOC3 counter | IOC4 counter | IOC5 counter | IOC6 counter | IOC7 counter | IOC8 counter |
|---|---|---|---|---|---|---|---|---|
| 96 | 80 | 20 | 20 | 5 | 1 | 1 | 0 | 0 |
| 76 | 50 | 36 | 8 | 7 | 2 | 0 | 0 | 0 |
| 41 | 30 | 15 | 6 | 3 | 3 | 1 | 0 | 0 |
| 36 | 30 | 10 | 4 | 0 | 0 | 0 | 0 | 0 |
| 8 | 8 | 1 | 0 | 0 | 0 | 0 | 0 | 0 |
| 1 | 1 | 0 | 0 | 0 | 0 | 0 | 0 | 0 |
| 0 | 0 | 0 | 0 | 0 | 0 | 0 | 0 | 0 |

Figure 4

SYSTEM AND METHOD FOR SIEM RULE SORTING AND CONDITIONAL EXECUTION

BACKGROUND

The invention relates generally to Security Information and Event Management (hereinafter "SIEM"), and in particular, to a method for processing security events by applying a rule-based alarm scheme, a related SIEM system for processing security events by applying a rule-based alarm scheme, and a computer program product.

Information technology (hereinafter "IT") security is a top priority list of IT executives. Most current Security Information and Event Monitoring (hereinafter "SIEM") solutions available require a set of complex correlation rules to be deployed, monitored and tuned manually, to effectively identify and detect potential security threats which may lead to security incidents impacting an organization.

A SIEM correlation rule engine usually demands high system resource consumptions (CPU and memory), as correlation rules using comparison operations, filters and thresholds to match a set of conditions and to be evaluated in real-time in light of a massive number of ingested security events.

On average, security events and logs produced in a typical enterprise IT environment, as well as by security solutions and devices, may vary between 1,000 events per second (hereinafter "EPS") to 100,000 EPS and may need to be correlated across a set of approximately an average of 100-400 distinct rules. Hence, most of the traditional SIEM technologies generate a heavy load on computing systems.

A security event (e.g., a log entry) is parsed by a static rule set. Static means that the rules are developed by humans and arranged in a fixed order. Each event passes through the rule set, either by passing through all the rules without raising any security incident or until a rule generates a security incident (aka offense), which typically makes further processing of this particular event no longer necessary as a security incident is from now on further enriched and processed.

Many rules with many conditions, i.e., large amount of required comparison operations when dealing with long lists of Indicators of Compromise (hereinafter "IoC"), e.g., list of malicious internet protocol (hereinafter "IP") addresses, must be evaluated before an offense is created. Consequently, computational resources may be wasted if rules with static IoC lists are processed in a static order. A processing of important events may be delayed, e.g., if a savvy hacker floods the SIEM system with many decoy events.

There are several disclosures related to a method for processing security events by applying a rule-based alarm scheme.

In light of the known technologies and the problems sketched above, a new approach may be required to generate security incidents requiring less computational efforts and increase the detection rate of security attacks at the same time.

SUMMARY

According to one aspect of the present invention, a method for processing security events by applying a rule-based alarm scheme may be provided. The method may include generating a rule index of rules, the rules to be applied when receiving an incoming security event, generating an indicator of compromise index for each of the rules, each entry of the indicator of compromise index comprising an indicator value to be used for a comparison against an attribute of a security event, and processing the incoming security event by sequentially applying the rules.

The method may further include increasing, in a rule incrementation step, a current rule counter relating to a triggered rule which processing has triggered an offense and increasing a current indicator of compromise counter pertaining to the triggered rule.

Additionally, the method may include generating a pseudo security event from received data about known attacks and related indicators of compromise, processing the pseudo security events by sequentially applying the rules, wherein the processing includes increasing a current rule counter of pseudo security events relating to the triggered rule which processing has triggered the offense, and increasing a current indicator of compromise counter for pseudo security events pertaining to the triggered rule.

The method may include sorting the rules in the rule index according to respective weighted rule counter values, and sorting, within each rule, the indicators of compromise in the indicator of compromise index according to weighted current indicator of compromise counter values.

According to another aspect of the present invention, a Security Information and Event Monitoring (hereinafter "SIEM") system for processing security events by applying a rule-based alarm scheme may be provided. The system may include a first generation unit adapted for generating a rule index of rules, the rules to be applied when receiving an incoming security event, wherein the generator unit is also adapted for generating an indicator of compromise index for each of the rules. Each entry of the indicator of compromise index may comprise an indicator value to be used for a comparison against an attribute of a security event. The SIEM system may also include a correlation engine adapted for processing the incoming security event by sequentially applying the rules, and an increment module adapted for increasing a current rule counter relating to a triggered rule which processing has triggered an offense, wherein the increment module is also adapted for increasing a current indicator of compromise counter pertaining to the triggered rule.

The SIEM system may additionally include a second generator unit adapted for generating a pseudo security event from received data about known attacks and related indicators of compromise, wherein the correlation engine is also adapted for processing the pseudo security events by sequentially applying the rules, wherein the processing includes increasing, by a pseudo security event counter module, a current rule counter of pseudo security events relating to the triggered rule which processing has triggered the offense, and increasing, by a counter for indicator of compromise for pseudo security events, a current indicator of compromise counter for pseudo security events pertaining to the triggered rule.

As further unit, the SIEM system may include a sorting module adapted for sorting the rules in the rule index according to respective weighted rule counter values, and adapted for sorting, within each rule, the indicators of compromise in the indicator of compromise index according to weighted current indicator of compromise counter values.

The proposed method for processing security events by applying a rule-based alarm scheme may offer multiple advantages and technical effects:

The proposed method may increase the capabilities of SIEM solutions in terms of a volume of events to be processed as well as a detection frequency. Available computing resources may be used more efficiently by generating offenses the kind of security events more quickly and more efficiently.

Instead of running each incoming event through a fixed set of rules, wherein each rule may include a fixed set of indicators of compromise, the method may dynamically sort the rules in such a way that rules generating offenses more frequently may be brought forward in the rule set. One may consider that after an offense was created out of an event, further processing of the event is no longer required; thus, the solution aims at triggering an offense with as little as possible comparison operations, i.e., computing resources.

To gauge the likelihood of triggering an offense for a rule two aspects may be considered: first the amount of offenses the rule has triggered for a given set of recent events, and secondly, the amount of offenses a rule would create in case the underlying system is attacked by currently ongoing security attack campaigns.

Additionally, and in a similar way, the indicators of compromise may be prioritized, i.e., by comparing event attributes against the most infamous indicators of compromise before the attribute may be compared with less notorious indicators of compromise. This approach may save required computing resources.

The optimization according to the proposed SIEM approach may be derived from processing an incoming security event primarily only by a subset of rules and by comparing event attributes only by a subset of indicators of compromise. This is in contrast to traditional solutions in which incoming security events are buffered and processed by applying all known rules. Only after an event and/or a related attribute have been processed against the complete rules set, a next incoming security event can be handled. Thus, an important event may be queued for a long time while many non-critical events are processed.

Hence, the proposed solution proposes a set of intermediate buffers, allowing to postpone an execution of rules triggering an offense only rarely, and is allowing processing more events by rules generating frequently offenses in the same given time period. Especially in attack scenarios, the proposed method prevents proactively delaying a recognition of crucial events by avoiding spending too many resources on decoy events.

In the following, additional embodiments of the inventive concept will be described.

According to one preferred embodiment of the method, the sorting the rules may also include determining the weighted rule counter values by combining—in particular by adding—weighted past rule counter values and weighted current rule counter values of the rule. This way, not only the most recent events may be reflected in the processing but also those that happened in the past. By applying a weighing factor, the importance of the past and the present events may be tuned according to a specific implementation.

According to another preferred embodiment of the method, the sorting, within each rule, the indicators of compromise also includes determining the weighted indicator of compromise counter values by combining—in particular by adding—weighted past IoC counter values and weighted current Indicators of Compromise (hereinafter "IoC"), counter values of the respective indicator of compromise. Thus, the principal applied to a weighing between past and present events in respect to the rules may also be applied to indicators of compromise in a corresponding way.

According to one useful embodiment of the method, the rule incrementation step may also include increasing the current rule counter by a fixed number—e.g., by "1"—or by a number indicative of a severity of the offense. Also this feature may support tuning and adapting the underlying SIEM system to actual attack patterns.

According to another useful embodiment of the method, the increasing the current indicator of compromise counter may also include increasing the current indicator of compromise counter by a fixed number, e.g., by "1". It may also be possible to increase the current indicator of compromise counter by another—e.g., higher number—depending on the importance of value of the indicator of compromise within a specific rule.

According to one advantageous embodiment of the method, the generating the pseudo security event may include applying tactic-technique-procedure (hereinafter "TTP") information identifying data from the received data about known attacks, wherein the received data about known attacks are received via a structured threat information expression (hereinafter "STIX") protocol. This way, known security threats may be distributed to SIEM systems so as to train for the SIEM system before security attacks may happen. This may be compared with a vaccination of the SIEM system. Most recent and most important security attacks may thus be ranked higher in the rule set of the SIEM system. This way, security attacks may be detected faster resulting in less computing resources required to identify the attack.

According to a further advantageous embodiment of the method, the generating the pseudo security event may comprise generating a pseudo security event for each phase of a sequence of partial cyber-attacks represented by attack patterns. This may include generating a sequence of pseudo security events, each of which may be directed to a different phase of a security attack chain or sequence (aka cyber kill chain).

According to an optional embodiment of the method, the generating the pseudo security event may additionally include generating a pseudo security event for each indicator of compromise relating to a respective rule. Thus, the principal used for making the SIEM rules more alert in respect to certain security attacks, may also be applied to indicators of compromise within a given rule.

According to an additionally preferred embodiment of the method, the generating a pseudo security event may also include resetting the current rule counter of pseudo security events to zero, and resetting the current indicator of compromise counter for pseudo security events to zero. Because the sorting may happen at regular times or scheduled in another way, setting the counters for the pseudo security events to zero may represent an easy way to add the current counters to the past counters once the sorting started. The current counters may then start to increase their values according to identified and processed security threats.

According to one permissive embodiment of the method, the sorting the rules in the rule index may include determining the weighted rule counter $RC_w$ by:

$$RC_w = P * \text{past rule counter} + (w_1 * \text{observed events}) + (w_2 * \text{pseudo security events})$$

where P=predefined percentage value and $w_1$, $w_2$= predefined weighing factor values. The same principle may be applied to both IoC counters, the current and the past one.

According to an additionally advantageous embodiment, the method may also include buffering the incoming security event after a predetermined first number of rules have been processed and within each processed rule a predetermined second number of indicator value groups have been processed, and continuing the processing of the buffered security event if a processing load of incoming security events may decrease below a predefined load threshold value.

This way, the computational load generated by the method and/or the related SIEM system, respectively, may be focused on the most important security threats, i.e., incoming security events. Rules that are not so highly ranked in the index of rules may be processed when spare computing capacity may become available at a later point in time.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

Preferred embodiments of the invention will be described, by way of example only, and with reference to the following drawings:

FIG. 4 shows an exemplary result of rule and Indicators of Compromise (hereinafter "IoC") counters according to an embodiment;

Figure 1:
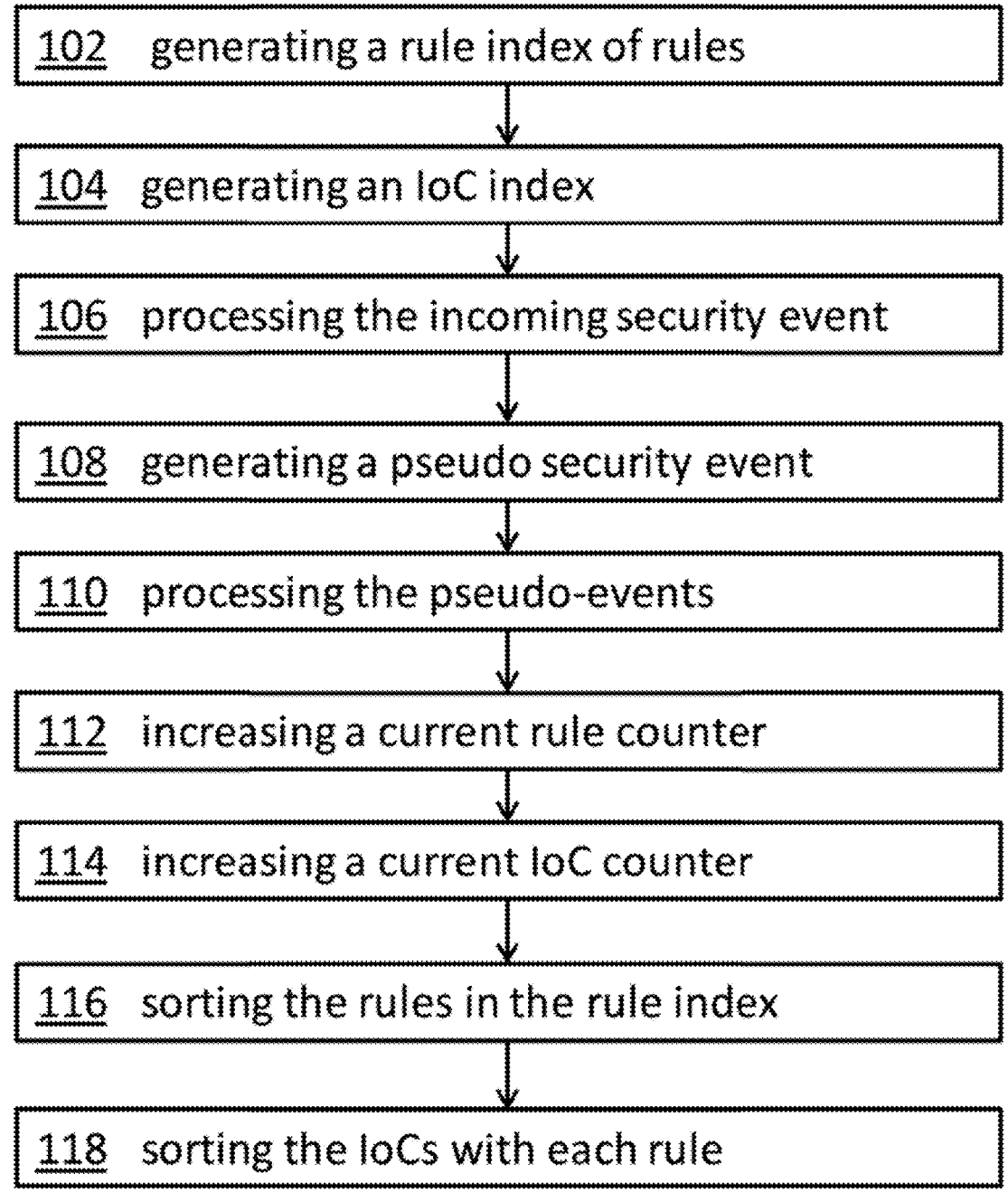
FIG. 1 shows a block diagram of an embodiment of the inventive method for processing security events by applying a rule-based alarm scheme.

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of Security Information and Event Management (hereinafter "SIEM"), and more particularly to a method for processing security events by applying a rule-based alarm scheme, a related SIEM system for processing security events by applying a rule-based alarm scheme, and a computer program product.

In the context of this description, the following conventions, terms and/or expressions may be used:

The term 'security event' may denote an entry in a security log system in which each interaction with other systems may be recorded. The security event may have a plurality of appearances, like, but not limited to, an email, a storage system access, a HTTP stands for Hyper Text Transfer Protocol (hereinafter "HTTP") request, a message of a social media system, a database request, just to name a few.

The term 'security threat' may denote a possible danger that might exploit a vulnerability to breach security of information technology systems and therefore cause possible harm. The term relates to the technical area of computer security and describes a potential attack, a non-allowed access or potential destruction or manipulation of data in computer or storage systems by an intruder or intruder system or take over control of the computer, storage or communication system. The security threads originate typically from a cyber-attack.

The term 'offense' may denote a potential attack to a computing system and or network system and all storage system. The offense may be generated by a SIEM system if dangerous patterns have been identified. Offenses may be related to each phase of a chain of cyber-security attacks.

The term 'cyber-attack chain' may denote a sequence of sub-attacks to a computer or similar system. Each stage or phase of the sequence builds on the previous one. There exist theoretical models with seven and also with 18 stages of a sequence or chain of cyber-attacks. In the course of this document the terms "sequence of partial cyber-attacks" and "cyber-attack chain" may be used synonymously.

The term 'rule index of rules' may denote a sorted list of rules for identifying potential cyber-attacks to computing systems and/or networks and/or storage systems, wherein each rule may have a specific set of indicators of compromise which may also be managed in related sorted lists. The priority within the sorted list may be changed and updated based on information received via a structured threat information expression (hereinafter "STIX") protocol from a trusted source of information technology (hereinafter "IT") security defense provider, e.g., via tactic-technique-procedure identifying rule (tactic-technique-procedure (hereinafter "TTP")) data.

The term 'indicator of compromise' (IoC) may denote in computer forensics and IT security an artifact observed on a network or in an operating system that with high confidence indicates a computer intrusion. Typical IoCs are virus signatures and internet protocol (hereinafter "IP") addresses, MD5 hashes of malware files or URLs or domain names of botnet command and control servers. After IoCs have been identified in a process of incident response and computer forensics, they may be used for early detection of future attack attempts using intrusion detection systems and anti-virus software. Known indicators are usually exchanged within the industry.

The term 'attribute of a security event' may denote an element of a recorded security event. An attribute value may be related to a sender email address, and IP address, a subject to an email, a specific text fragment in the body of an email, and access to a particular database, a hash value of an malicious attachment and many other values relating to attributes of security events.

The term 'pseudo security event' may denote an artificially generated security event originating from within a SIEM system trying to prepare itself for future incoming security events coming from the outside of the SIEM system. These pseudo security events may be based on data indicating probable security attacks and may be instrumental for making the SIEM system more alert to expected attacks than other known potential attacks. This way, the SIEM system may be trained for a particular sort of expected cyber-attacks in one or more phases of a cyber security sequence. A prioritization and sequence of detection by a sorted list of rules may help to save computing resources.

The term 'structured threat information expression' (STIX) may denote a repository of collected expressions of cyber-security relevant expressions. STIX is a U.S. Department of Homeland Security-led effort of the office of Cybersecurity and Homeland. STIX is a collaborative, community-driven effort to define and develop a structured language (i.e., protocol) to represent cyber threat information. The STIX language conveys the full range of potential cyber threat information and strives to be fully expressive, flexible, extensible, automatable, and as human-readable as possible. All interested parties are welcome to participate in evolving STIX as part of its open, collaborative community. STIX use-cases include (i) analyzing cyber threats; (ii) specifying indicator patterns for cyber threats; (iii) managing cyber threat prevention and response activities; (iv) sharing cyber threat information.

The term 'tactic-technique-procedure identifying rules' (TTP) may denote a set of rules according to which cyber security attacks may be identified with a high probability because the rules may be kept current and may propose rules with related indicators of compromise for each phase of a sequence of security attacks.

In the following, a detailed description of the figures will be given. All instructions in the figures are schematic. Firstly, a block diagram of an embodiment of the inventive method for processing security events by applying a rule-based alarm scheme is given. Afterwards, further embodiments, as well as embodiments of the SIEM system for processing security events by applying a rule-based alarm scheme, will be described.

FIG. 1 shows a block diagram of an embodiment of the method 100 for processing security events. The processing is performed by applying a rule-based alarm scheme for determining whether a received security event is considered as offense. Activities of the method 100 include generating, 102, a rule index of rules. The rules are typically applied when an incoming security event is received.

The method 100 also includes generating, 104, an indicator of compromise (IoC) index for each of the rules, each entry of the indicator of compromise index including an indicator value to be used for a comparison against an attribute value of a security event. In reality, only related IoCs and attributes values of the security event—typically, a plurality—will be compared, like email addresses, IP addresses, subject lines or text elements (in case of an email) hash values, and the like.

The method includes processing, 106, the incoming security event by sequentially applying the rules. During regular operation, this may happen security event after security event, while increasing a current rule counter relating to a triggered rule which processing has triggered an offense, and increasing a current indicator of compromise counter pertaining to the triggered rule. Due to the design of the proposed concept, not all incoming security events may be processed against all rules and all IoCs.

The method 100 may further include generating, 108, a pseudo security event—in particular to train the rule set—from received data about known attacks and related indicators of compromise, and processing, 110, the pseudo security events by sequentially applying the rules. The processing comprises consequently increasing, 112, a current rule counter of pseudo security events relating to the triggered rule which processing has triggered the offense, and increasing, 114, a current indicator of compromise counter for pseudo security events pertaining to the triggered rule.

Finally the method 100 includes sorting, 116, the rules in the rule index according to a respective weighted rule counter—in particular equivalent to their likelihood of triggering an offense, e.g., in descending order, and sorting, 118, within each rule the indicator of compromise values in the indicator of compromise index according to their weighted current indicator of compromise counter, also, e.g., in descending order.

Figure 2:
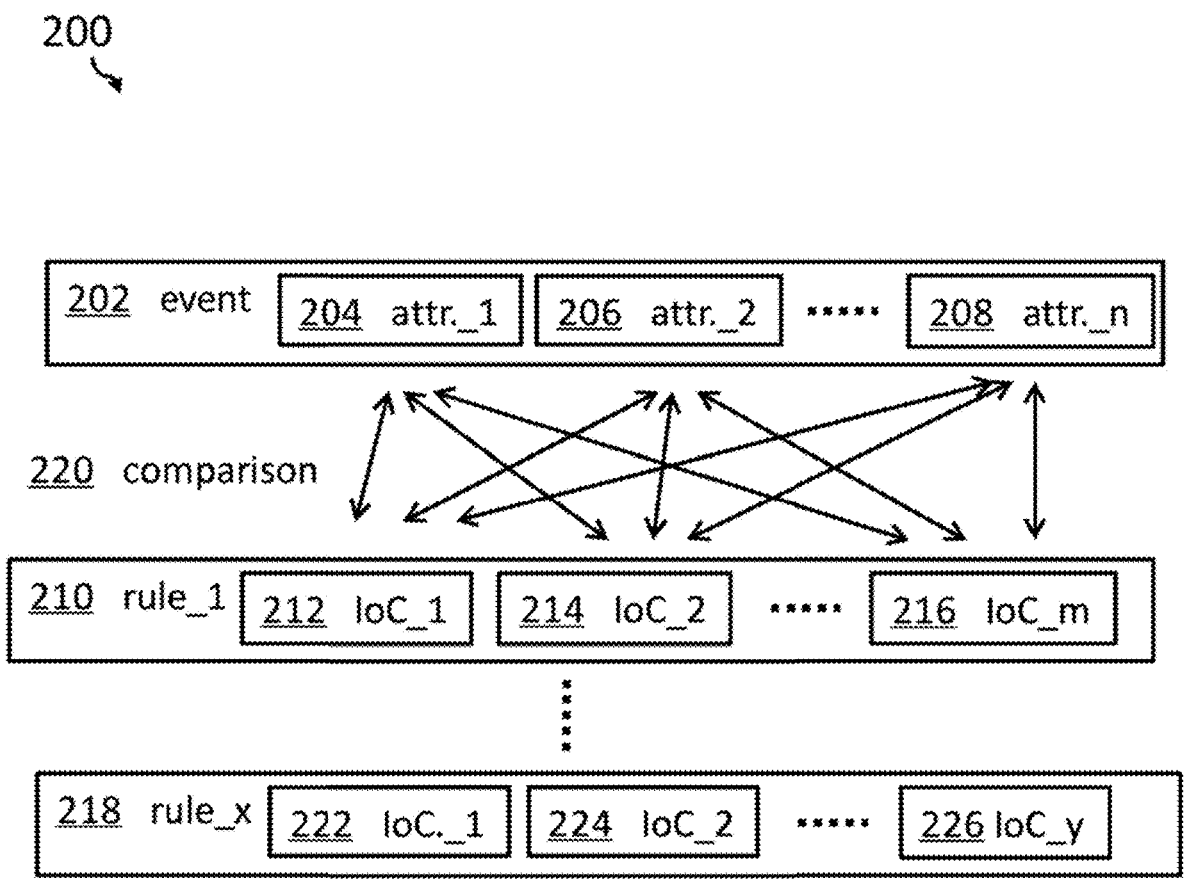
FIG. 2 shows a block diagram of a comparison of attribute values of a security event rules and related indicators of compromise according to an embodiment.

FIG. 2 shows a block diagram 200 of a comparison 220, according to an embodiment. The block diagram 200 of a comparison 220 of attribute values of a security event 202 against rules 210 and 218 and related indicators of compromise 204, 206, 208, 212, 214, 216, 212, 214, 216, 222, 224, 226. The security event 202 may enter the STEM system. The security event 202 may have one or more attributes: attribute_1 204, attribute_2 206, . . . , attribute_n 208. Depending on the type of security event 202 the attributes 204, 206, 208 may be completely different. Incoming emails may have totally different attributes if compared to a database request or a network access. However, components of the SIEM system may be adapted to identify and separate the different attributes and manage them as different attribute types for further processing.

One type of processing may be a comparison of selected ones of the attributes 204, 206, 208 with indicators of compromise IoC_1 212, IoC_2 214, . . . , IoC_m 216. Thereby, the SIEM system may only compare those attributes to indicators of compromise of the same type which may help for it to save computing resources. It may also be noted that the IoCs belong to different rules, e.g., rule_1 210, . . . , rule_x 218. Typically, in a SIEM system hundreds or more rules are managed. It may be obvious that the computing resources required comparing security event 202 attributes with rewards and the related IoCs may be compute intensive. In order to reduce this computational effort, the next figure illustrates how a sorting and prioritization of groups of rules, as well as other mechanisms, e.g., buffering may help to reduce the compute time to securely identify cyber-security attacks, i.e., malicious security events.

Figure 3:
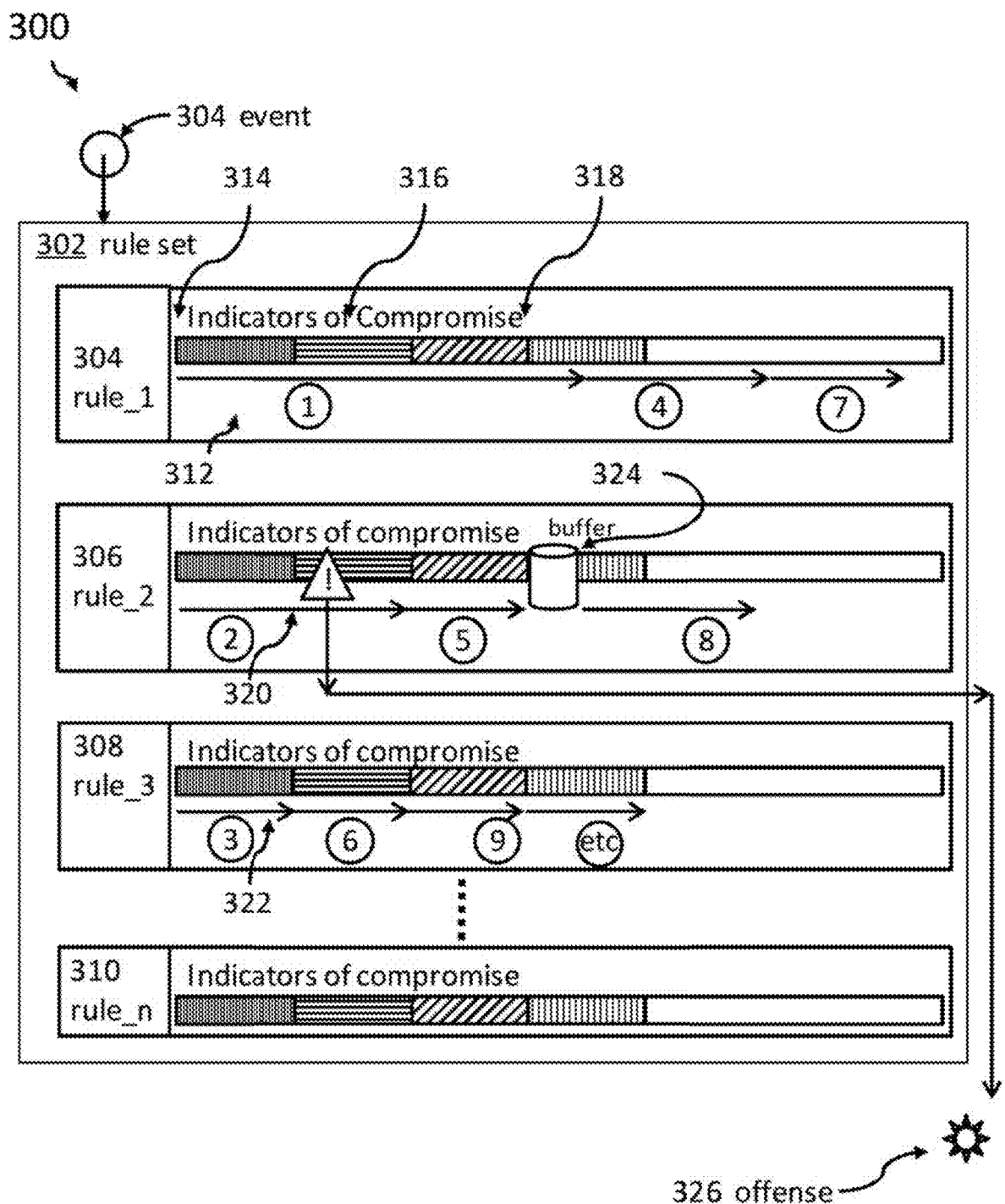
FIG. 3 shows a block diagram of an embodiment of a scheme of rules, groups of IoCs and a buffer according to an embodiment.

FIG. 3 shows a block diagram of an embodiment 300 illustrating according to which rule set and which groups of IoCs an incoming event is processed. A SIEM record or security event 304 are stored intermediately (FIFO) in a, e.g., log file before they are sent through a correlation engine (a rule processor). In traditional SIEM systems, the rules are put by a human in a static order. Each event is processed by each rule. In each rule, the attribute of the security event is compared to a static list of given IoCs. In one implementation, the processing for a certain security event may be terminated once an offense is created, and in another implementation, the security event is parsed by all rules regardless of a generation of an offense. The set of rules, as indicated by 302, comprises a plurality of rules: rule_1 304, rule_2 306, rule_3 308, . . . , rule_n 310.

The efficiency of processing of traditional SIEM systems depends heavily on human made decisions of rule ordering. The rule order is static and is not changed depending on current hacking campaigns/attack patterns in various phases of a sequence of cyber-security attacks. Also valid for traditional SIEM systems: The IoCs are typically downloaded and not sorted considering performance parameters.

In contrast to this, and as shown in FIG. 3, the rules 304, 306, 308, 310 are sorted by the likelihood of generating offenses. Within each rule, IoCs are sorted by the likelihood of generating an offense. Thus, an event is not checked against all IoCs of a rule; rather the IoCs are grouped, and the attributes of each event are compared to a specific group of IoCs. It may be noted that the proposed concept also works if attackers disguise their traces by dynamically changing their "fingerprints", such as IP address, email address, signature of infected files, etc. It may also be appreciated that the list of IoCs may comprise thousands of entries.

The numbered arrows in FIG. 3 show the exemplary order in which a security event is processed by the rules and the security event 304 attributes are checked against IoCs. There are groups 314, 316, 318 of most "notorious" IoCs in rule_1 304 (which may have the highest likelihood of generating an offense). Arrow 312 may indicate that these IoCs will be used first to check whether there will be an offense generated by applying rule_1 304 to an incoming security event 304.

In rule_2 306, two other groups of IoCs are highly ranked, indicated by arrow 320. In rule_3 308, only one group of IoCs, indicated by arrow 322, will be checked initially. From here on it may be clear in which sequence 1, 2, 3, 4, 5, 6, 7, 8, 9 the groups and corresponding IoCs will be used to determine whether the incoming security event 304 may be malicious and thus may create an offense.

Moreover, to allow the next security event to be parsed by the most promising rules, the current event is kept after step five (arrow 5) in an intermediate FIFO buffer 324. Only when the flow of incoming security events ceases, or the intermediate buffer is full, incoming security events from the intermediate buffer are processed by the remaining step 6 onwards.

As a predetermined parameter, the method requires the number of rules subsets (or rule priority levels), e.g., 2 or 5, and the number of intermediate event buffers. The number of event buffers must be at least one lower than the number of rules subsets, as the buffers are placed between the subsets of IoCs.

As can be recognized, in the second IoC group of rule_2 306 an offense 326 is created for further processing outside the here described sorting of rules and IoCs.

The described method comprises at least four aspects:
Prepare index and counters (executed once);
Process events (executed with every incoming event);
Generate pseudo security events form information about TTPs and process pseudo security events (executed on a regular basis, e.g., after a predefined number of events have been parsed, after a predefined time interval has passed); and
Rule sorting and placing buffers (executed after pseudo security events are processed).

In detail: Preparation of indexes and counters:
Generate an index of all rules and an index of all comparison operations (event attribute with IoC) within each rule;

Assign two "current" integer counters upon each index entry, one counter for observed events (real events) and one counter for events generated by this method (pseudo security events, see below). These counters are named "current" as they count offenses generated in the current time window.

Assign two "past" integer counters upon each index entry in the same way as above. These counters are named "past" as they comprise the number of offenses counted previously.

In detail: Processing of security events:
When a rule generating an offense increases the current, i.e., the observed or current events counters. In one implementation the counter may be increased by one, in another implementation it may be increased by a measure for the magnitude of the offense.

When a rule has generated an offense, the matching IoC current counters are increased, i.e., observed event counter(s) for a current rule which matched the attribute(s) of event.

In detail: Generation of pseudo security events form information about TTPs and parse pseudo security events:
Both, rule and IoCs pseudo security event counters are set to zero.

Get TTPs including IoCs from a trusted external source (e.g., using the STIX protocol).
Create pseudo security events from the TTPs information:
  a. For each TTP generated, one pseudo security event per phase in the sequence of security attacks (aka kill chain);
  b. The event type (and log source type) is taken from the sequence of security attacks phase;
  c. The attributes are populated from the IoC. Generate one pseudo security event per IoC.

As an example, consider the known TTP spear phishing campaign, phase 2 "Weaponization": a malicious email is sent form the domain @benefit-city.com with the subject "mail for you" or "photo for you" with a virus identified by the hash key 3CB5F. Generate two events "mail received containing a virus" from the log source mail server with the attributes above.

Run the pseudo security events through the rule set.
For every rule generating an offense by a pseudo security event increase the current pseudo security event counter by one (or in another implantation by a weight assigned to the campaign from which the pseudo security event originated).

When a rule has generated an offense, increase the matching IoC current, pseudo security event counter(s) of this rule as in the previous step.

In detail: Rule sorting and placing buffers:

New rule counters and IoC counters are calculated from past counters and current counters in the following way:

new counter=$P$*past rule counter+($w_1$*observed events)+($w_2$*pseudo security events)

new counter=$P$*past counter+($w_1$*observed events+$w_2$*pseudo security events), where P is a predefined percentage value (e.g. 50%) to limit the influence of past events and $w_1$ and $w_2$ are predefined weights, balancing the influence of observed events and expected events by ongoing campaigns registered in the TTP database.

The rules are sorted by value of their new rule counters in, e.g., a descending order, i.e., the rule with the highest counter is the first in the rules set; rules which never fired are at the bottom of the rule set and are evaluated at last.

Within each rule, the lists of IoCs are sorted by the new IOC counters, e.g., in descending order, i.e., the attributes of an event are first checked against the IoCs which have in the past most frequently found in attributes, i.e., first checked against the IoCs most likely contributing to the generation of an offense.

Reset all current rule and current IoC counters to 0.

Assign the value of each new rule counter to each past rule counter and new IoC counter to each past IoC counter, i.e., past counter=new counter.

Create a predefined number of event buffers within the rule set. The placement of the rule is aligned with the execution order (see below).

FIG. 4 shows a block diagram of an exemplary result 400 of rule and IoC counters, according to an embodiment. FIG. 4 shows a simplified example of a rule set including 7 rules. The rules in the rule set have been ordered following step 2 of "Rule sorting and placing buffers". The IoCs have been ordered following step 3. Horizontal lines related to different rules. Per rule—shown as vertical lines—IoC counters are listed. E.g., the rule with the top count shows 96 counts with related IoC counters showing: IoC1=80, IoC2=20 IoC3=20, IoC4=5, IoC5=1, IoC6=1, etc., counts.

In this example, the rule counter is increased by one when the rule generated an offense (not by a magnitude 1-10 of the offense). Within one rule, the sum of IoC counters is typically higher than the rule counter, as several IoC contribute to triggering an offense, e.g., a rule may comprise the condition on event attributes, mail_address="info@benefit-city.com" AND subject="mail for you".

In this example, the number of rule subsets (rule priority levels) is set to 3 and the number of event buffers is set to 2. Each rule subset is described by either a relative or an absolute IoC counter.

Also in this example, the relative number of IoC counters is used to define subsets. First (highest priority, diagonal stripes), the rules and comparison operations are performed to cover 90% of the IoC counters (count of 307 of 342 total counts), i.e., the attributes of an event are first checked against IoCs which have an overwhelming hit count, however, only against the minority of IoCs (11 out of 56). After the event is processed by the first rule subset, the event is buffered (compare to FIG. 5), and another incoming event is processed by the first rule subset.

The second rule subset (horizontal stripes) is defined by the rules and comparison operations covering 98% of the IoC hit counters (count of 335), excluding the IoCs already checked. Again, after an event is processed by the second rule set it is buffered.

The third rule subset (no stripes) comprises the remaining comparison operations.

A real implementation comprises typically a few 100 rules and lists with IoCs comprising thousands of entries. To make the example more realistic, one has to imagine many more rules at the bottom of the rule set firing seldom and adding thousands of columns containing IoCs with zeros to the right. This makes the advantage of this invention more obvious.

In another implementation, the first rule subset is defined as: for a given event execute all comparison operations using only IoCs with a counter≥10. The second rule subset includes all comparison operations using IoCs with a counter between 9 and 1. The third rule subset includes all comparison operations using IoCs which have not triggered any offenses according to their counter.

The method requires that the buffer sizes (in terms of number of events or megabytes) and the default distribution of computing resources (e.g. virtual CPUs) are predefined. It is advisable to set the buffer size to the same value for all buffers and assign more computing resources to the first rule set and less computing resources to the last rule set, e.g. 50%, 25%, 12.5%, etc.

Figure 5:
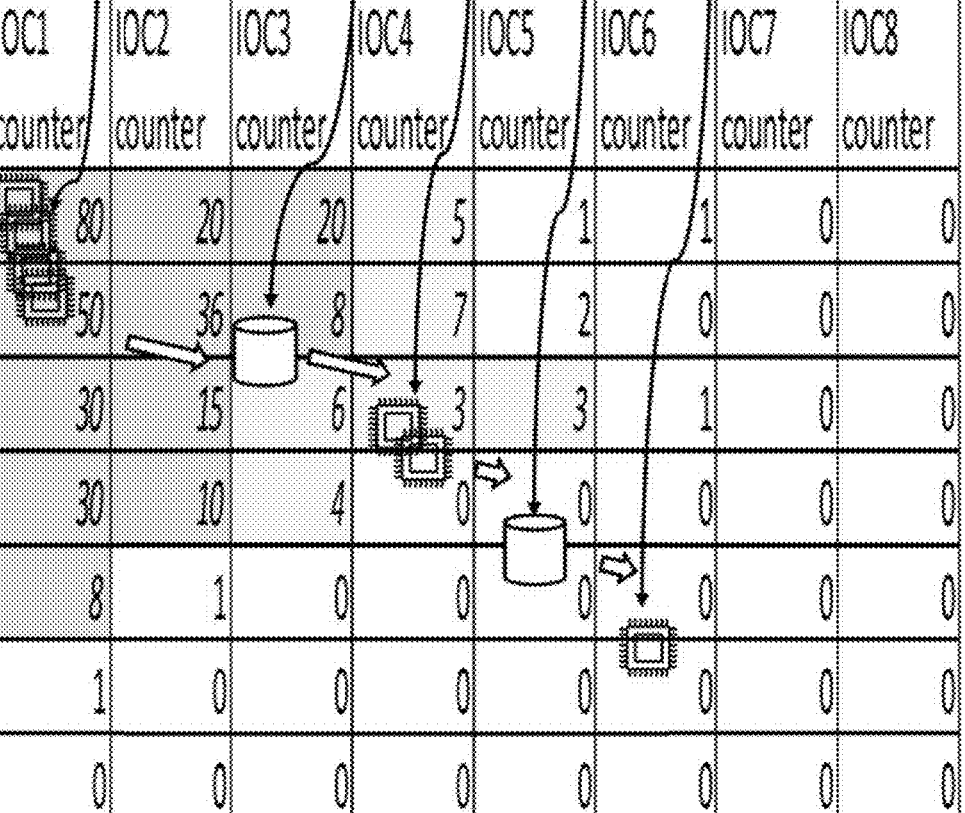
FIG. 5 shows an exemplary result of rule and IoC counters in combination with resource allocation according to an embodiment.

FIG. 5 shows an exemplary result 500 of rule and IoC counters in combination with resource allocation, according to an embodiment.

Considering the previous example on a computer with 8 virtual CPUs; by default 4, 2, 1 CPUs 506, 508, 510 may be assigned to process events in the first, second and third rule subset respectively. The remaining CPU is assigned for overall coordination.

In case buffer A 502 is full and hence the first 4 CPUs 506 are idle, they are assigned temporarily to process events in the second rule subset (horizontal stripes). As soon as buffer A 502 utilization drops (e.g., below 80%), the four CPUs 502 are assigned again to process events in the first rule subset. The same method is applied when buffer B 504 runs full.

This way, it is ensured that incoming events are processed by the most promising rules to generate offenses and event attributes are checked quickly against the most notorious IoCs, so that attacks are detected more quickly.

An extension of the above presented version of the method is also possible. In the implementation above, the method deals with one dynamically optimized rule set. The two sets of results in terms of offenses generated from two input sources observed events and pseudo security events are weighted.

In another implementation, the system can manage two rule sets. One rule set (the primary rule set) may be optimized based on the generation of offense by observed events (i.e. $w_2$=0). By default, the primary rule set is loaded into the rule engine and processes events.

Another rule set (secondary rule set) may be optimized based on the generation of offense by observed events and pseudo security events with a significant weight $w_3$. The pseudo security events are generated by the method above and stored in a database. The method "process events" is augmented by an extra step: In case the number of observed events matching to pseudo security events exceeds a predetermined threshold, the secondary rule set replaces the primary rule set. After a predetermined period (defined in number of events processed or time passed), the primary rule set is loaded into the rule engine again unless events matching pseudo security events are still observed.

In another implementation more than two rule sets are defined. Pseudo security events are grouped by threat scenario (retrieved from the TTP source). One rule set covers one or more threat scenario. As above, the appropriate rule set is loaded into the rule engine the number of observed events matching to pseudo security events of a specific threat scenario exceeds a pre-determined threshold.

Figure 6:
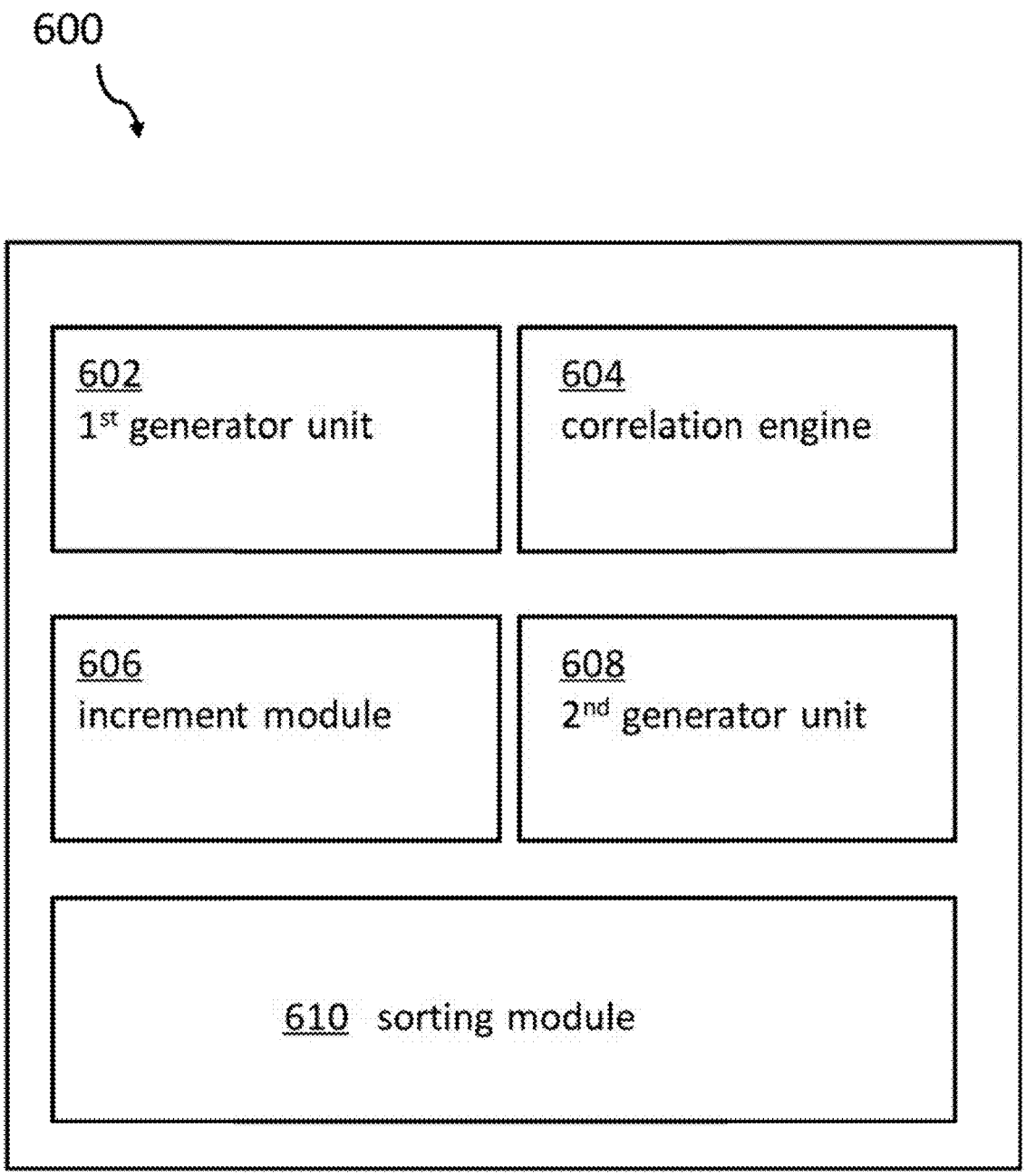
FIG. 6 shows an embodiment of a block diagram of the inventive Security Information and Event Monitoring (hereinafter "STEM") system for processing security events by applying a rule-based alarm scheme according to an embodiment.

FIG. 6 shows a block diagram of a SIEM system 600 for processing security events by applying a rule-based alarm scheme for determining whether a received security event is considered as offense. The SIEM system 600 includes a first generator unit 602 adapted for generating a rule index of rules, wherein the rules are applied when receiving an incoming security event. Thereby, the generator unit 602 is also adapted for generating an indicator of compromise index for each of the rules. Each entry of the indicator of compromise index comprises an indicator value to be used for a comparison against an attribute of a security event.

The system 600 includes also a correlation engine 604 adapted for processing the incoming security event by sequentially applying the rules, and an increment module 606 adapted for increasing a current rule counter relating to a triggered rule which processing has triggered an offense, wherein the increment module is also adapted for increasing a current indicator of compromise counter pertaining to the triggered rule.

A second generator unit 608 adapted for generating a pseudo security event from received data about known attacks and related indicators of compromise. A correlation engine 604 is also adapted for processing the pseudo security events by sequentially applying the rules. Thereby, the processing comprises increasing, by a pseudo security event counter module, a current rule counter of pseudo security events relating to the triggered rule which processing has triggered the offense, and increasing, by a counter for indicator of compromise for pseudo security events, a current indicator of compromise counter for pseudo security events pertaining to the triggered rule.

An additional sorting module 610 of the SIEM system 600 is adapted for sorting the rules in the rule index according to a respective weighted rule counter, and also adapted for sorting within each rule the indicator of compromise values in the indicator of compromise index according to their weighted current indicator of compromise counter.

Figure 7:
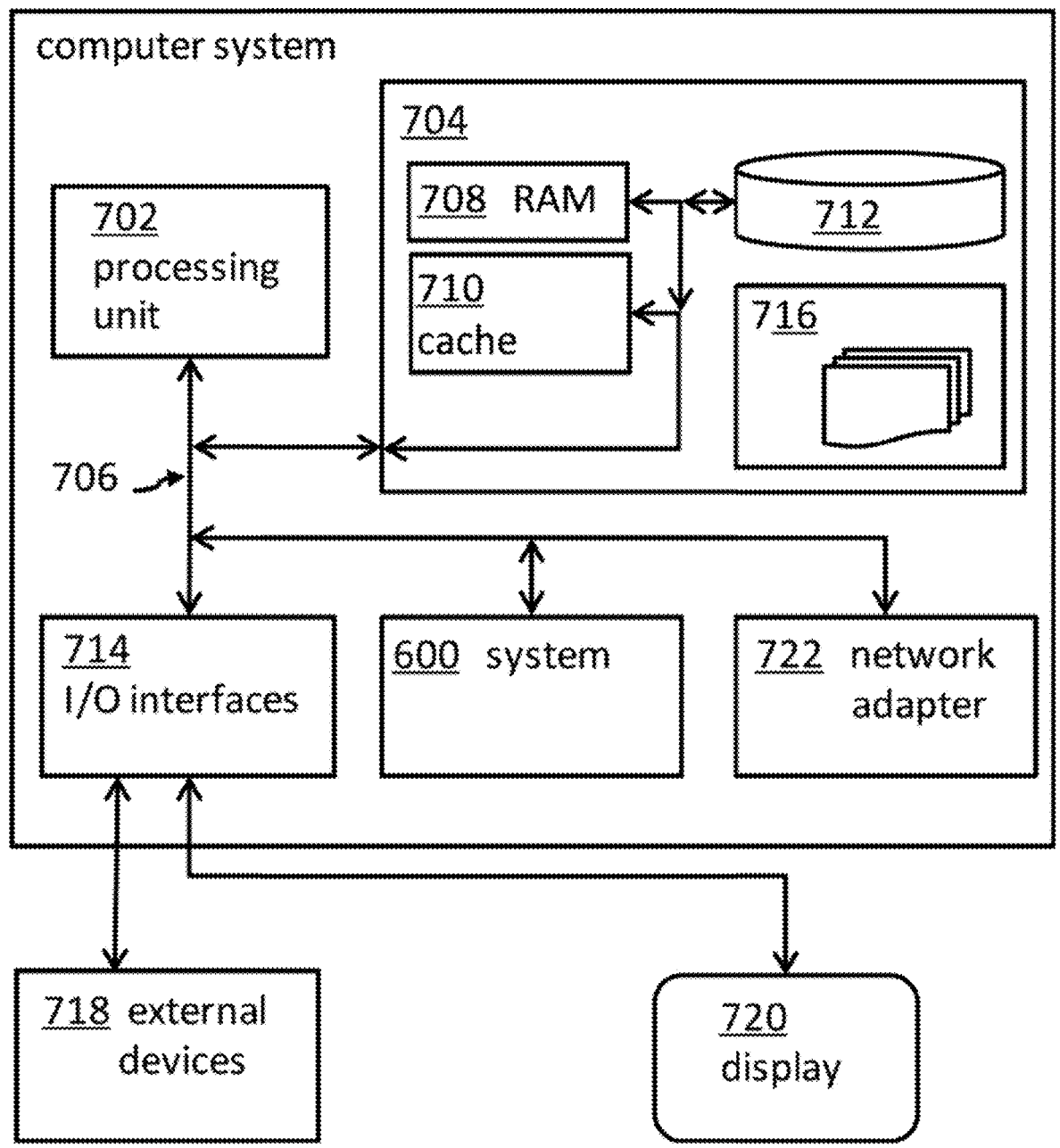
FIG. 7 shows an embodiment of a computing system comprising the SIEM system according to FIG. 6 according to an embodiment.

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the SIEM system 600 for processing security events by applying a rule-based alarm scheme may be attached to the bus system 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be described by the following clauses:

A method for processing security events by applying a rule-based alarm scheme for determining whether a received security event is considered as offense, the method including: generating a rule index of rules, the rules to be applied when receiving an incoming security event; generating an indicator of compromise index for each of the rules, each entry of the indicator of compromise index including an indicator value to be used for a comparison against an attribute of a security event; processing the incoming security event by sequentially applying the rules, wherein the processing includes increasing, in a rule incrementation step, a current rule counter relating to a triggered rule which processing has triggered an offense, and increasing a current indicator of compromise counter pertaining to the triggered rule; generating a pseudo security event from received data about known attacks and related indicators of compromise; and processing the pseudo security events by sequentially applying the rules, wherein the processing includes increasing, in a rule incrementation step, a current rule counter of pseudo security events relating to the triggered rule which processing has triggered the offense, and increasing a current indicator of compromise counter for pseudo security events pertaining to the triggered rule, and sorting the rules in the rule index according to respective weighted rule counter values, and sorting, within each rule, the indicators of compromise in the indicator of compromise index according to weighted current indicator of compromise counter values.

The method where the sorting the rules also include determining the weighted rule counter values by combining weighted past rule counter values and weighted current rule counter values of the rule.

The method where the sorting, within each rule, the indicators of compromise also includes determining the weighted indicator of compromise counter values by combining weighted past indicator of compromise value counter values and weighted current indicator of compromise counter values of the respective indicator of compromise.

The method where the rule incrementation step also includes increasing the current rule counter by a fixed number or by a number indicative of a severity of the offense.

The method where the increasing the current indicator of compromise counter also includes increasing the current indicator of compromise counter by a fixed number.

The method where the generating the pseudo security event includes applying tactic-technique-procedure (TTP) identifying data from the received data about known attacks, where the received data about known attacks are received via a structured threat information expression (STIX) protocol.

The method where the generating the pseudo security event includes generating a pseudo security event for each phase of a sequence of partial cyber-attacks represented by attack patterns.

The method where the generating the pseudo security event includes generating a pseudo security event for each indicator of compromise relating to a respective rule.

The method where the generating a pseudo security event also includes resetting the current rule counter of pseudo security events to zero, and resetting the current indicator of compromise counter for pseudo security events to zero.

The method where the sorting the rules in the rule index includes determining the weighted rule counter $RC_w$ by $RC_w = P*$past rule counter$+(w_1*$observed events$)+$ $(w_2*$pseudo security events$)$, where P=predefined percentage value and $w_1$, $w_2$=predefined weighing factor values.

The method also including buffering the incoming security event after a predetermined first number of rules have been processed and within each processed rule a predetermined second number of indicator of compromise counter groups have been processed, and continue the processing of the buffered security event if a processing load of incoming security events decreases below a predefined load threshold value.

A SIEM system for processing security events by applying a rule-based alarm scheme for determining whether a received security event is considered as offense, the system including: a first generation unit adapted for generating a rule index of rules, the rules to be applied when receiving an incoming security event, wherein the generator unit is also adapted for generating an indicator of compromise index for each of the rules, each entry of the indicator of compromise index comprising an indicator value to be used for a comparison against an attribute of a security event; a correlation engine adapted for processing the incoming security event by sequentially applying the rules; an increment module adapted for increasing a current rule counter relating to a triggered rule which processing has triggered an offense, where the increment module is also adapted for increasing a current indicator of compromise counter pertaining to the triggered rule; a second generator unit adapted for generating a pseudo security event from received data about known attacks and related indicators of compromise; and where the correlation engine is also adapted for processing the pseudo security events by sequentially applying the rules, where the processing includes increasing, by a pseudo security event counter module, a current rule counter of pseudo security events relating to the triggered rule which processing has triggered the offense, and increasing, by a counter for indicator of compromise for pseudo security events, a current indicator of compromise counter for pseudo security events pertaining to the triggered rule, and a sorting module adapted for sorting the rules in the rule index according to a respective weighted rule counter values, and adapted for sorting, within each rule, the indicators of compromise in the indicator of compromise index according to weighted indicator of compromise counter values.

The system where the sorting module is also adapted for determining the weighted rule counter values by combining a weighted past rule counter and a weighted current rule counter of the rule.

The system where the sorting module is also adapted for determining the weighted indicator of compromise counter values by combining a weighted past indicator of compromise counter and a weighted current indicator of compromise counter of the respective indicator value.

The system where the increment module is also adapted for increasing the current rule counter by a fixed number or by a number indicative of a severity of the offense.

The system where the increment module is also adapted for increasing the current indicator of compromise counter by a fixed number.

The system where the second generator unit is also adapted for applying tactic-technique-procedure (TTP) identifying data from the received data about known attacks, where the received data about known attacks are received via a structured threat information expression (STIX) protocol.

The system where the second generator unit is also adapted for generating a pseudo security event for each phase of a sequence of partial cyber-attacks represented by attack patterns.

The system where the second generator unit is also adapted for generating a pseudo security event for each indicator of compromise relating to a respective rule.

The system where the second generator is also adapted for resetting the current rule counter of pseudo security events to zero, and resetting the current indicator of compromise counter for pseudo security events to zero.

The system where the sorting module is also adapted for determining the weighted rule counter $RG_w$ by $RC_w = P*$past rule counter$+(w_1*$observed events$)+$ $(w_2*$pseudo security events$)$, where P=predefined percentage value and $w_1$, $w_2$= predefined weighing factor values.

The system also including an intermediate storage adapted for buffering the incoming security event after a predetermined first number of rules have been processed and within each processed rule a predetermined second number of indicator value groups have been processed, and also adapted for triggering a continuation of the processing of the buffered security event if a processing load of incoming security events decreases below a predefined load threshold value.

A computer program product for processing security events by applying a rule-based alarm scheme for determining whether a received security event is considered as offense, the computer program product including a computer readable storage medium having program instructions embodied, the program instructions being executable by one or more computing systems or controllers to cause the one or more computing systems to: generate a rule index of rules, the rules to be applied when receiving an incoming security event; generate an indicator of compromise index for each of the rules, each entry of the indicator of compromise index including an indicator value to be used for a comparison against an attribute of a security event; process the incoming security event by sequentially applying the rules; increase a current rule counter relating to a triggered rule which processing has triggered an offense; increase a current indicator of compromise counter pertaining to the triggered rule; generate a pseudo security event from received data about known attacks and related indicators of compromise; and process the pseudo security events by sequentially applying the rules, wherein the processing includes increasing a current rule counter of pseudo security events relating to the triggered rule which processing has triggered the offense, and increasing a current indicator of compromise counter for pseudo security events pertaining to the triggered rule, and sorting the rules in the rule index according to respective weighted rule counter values, and sorting, within each rule, the indicators of compromise in the indicator of compromise index according to weighted indicator of compromise counter values.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
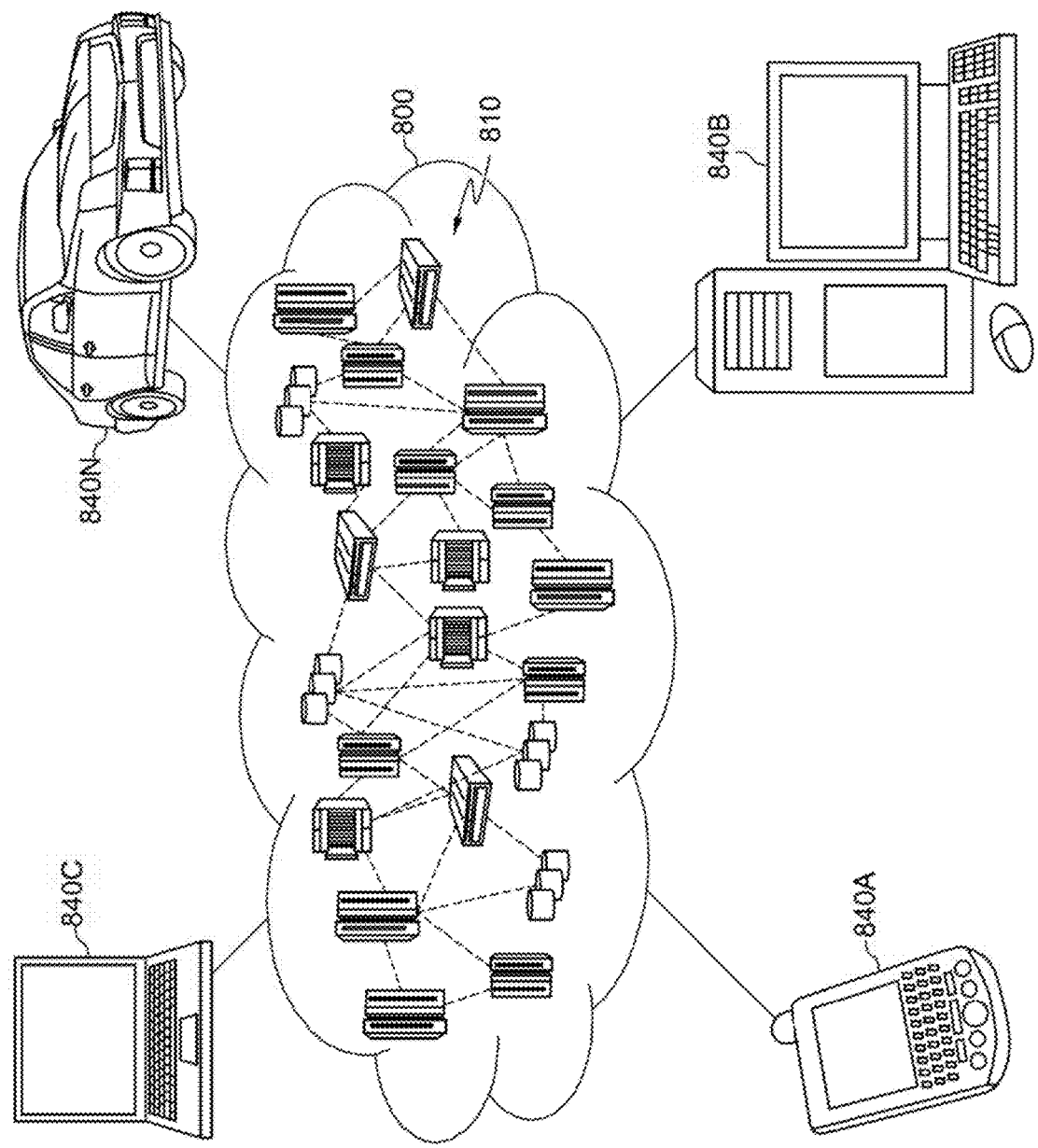
FIG. 8 shows a cloud computing environment according to an embodiment of the present invention.

Referring now to FIG. 8, illustrative cloud computing environment 800 is depicted. As shown, cloud computing environment 800 includes one or more cloud computing nodes 810 with which local computing devices used by cloud consumers, such as, for example, personal digital assistant (PDA) or cellular telephone 840A, desktop computer 840B, laptop computer 840C, and/or automobile computer system 840N may communicate. Cloud computing nodes 810 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 840A-N shown in FIG. 8 are intended to be illustrative only and that cloud computing nodes 810 and cloud computing environment 800 can communicate with any type of computerized device over any type of network and/or network addressable connection (e.g., using a web browser).

Figure 9:
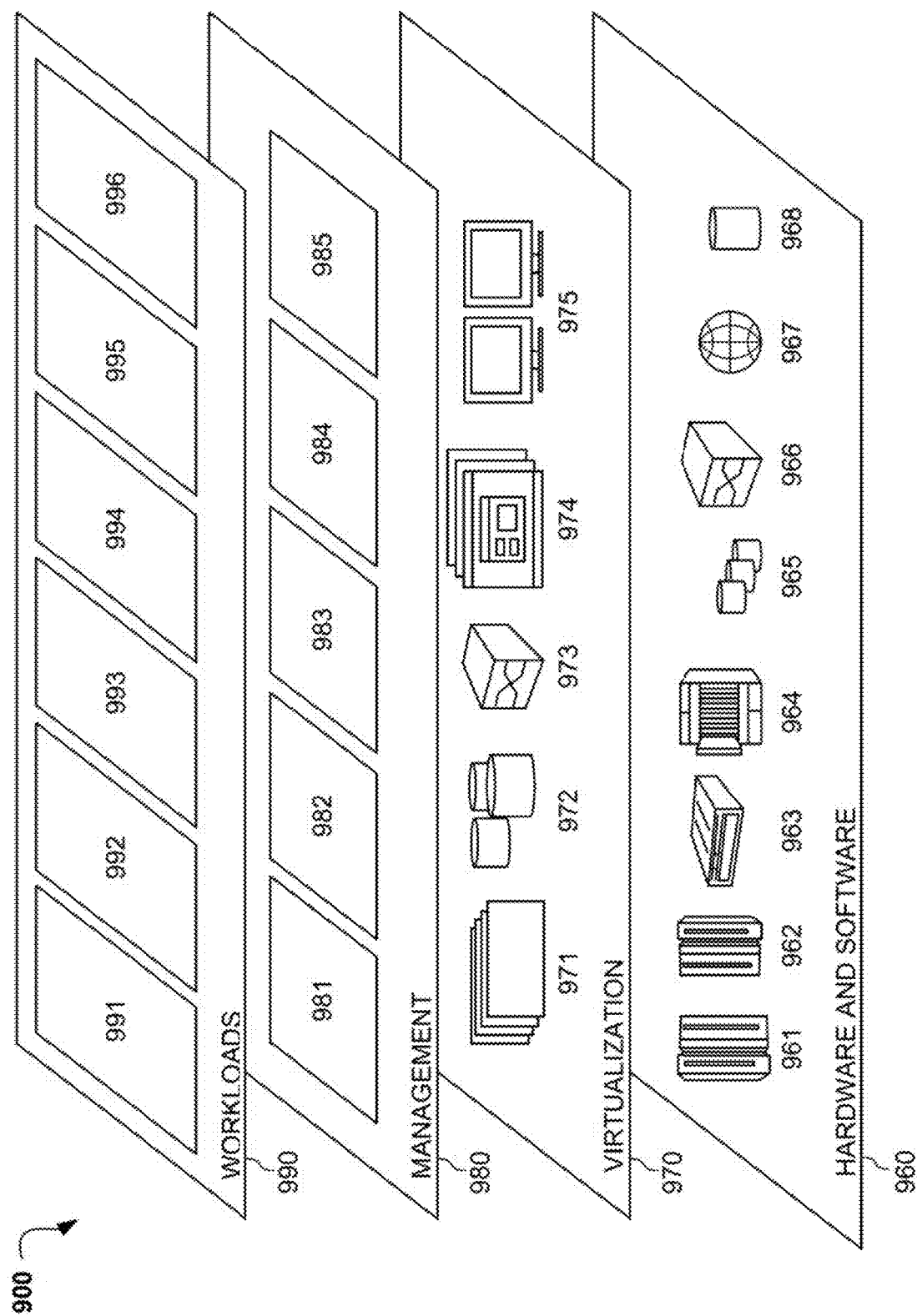
FIG. 9 shows abstraction model layers according to an embodiment of the present invention.

Referring now to FIG. 9, a set of functional abstraction layers provided by cloud computing environment 800 (as shown in FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972, for example the system memory as shown in FIG. 7; virtual networks 973, including virtual private networks; virtual applications and operating systems 974; and virtual clients 975.

In an example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and security information and event management 996. The security information and event management 996 may relate to processing security events by applying a rule-based scheme.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing security events by applying a rule-based alarm scheme for determining whether a received security event is considered as offense, the method comprising:
    generating a rule index of rules, the rules to be applied when receiving an incoming security event;
    generating a respective indicator of compromise index for each of the rules, each respective indicator of compromise index comprising indicator values of indicators of compromise to be used for a comparison against an attribute of a security event;
    processing the incoming security event by sequentially applying the rules, wherein processing the incoming security event by sequentially applying the rules comprises:
        increasing, in a rule incrementation step, a current rule counter relating to a triggered rule, wherein the triggered rule comprises a respective one of the rules that triggered an offense during the processing, and
        increasing a current indicator of compromise counter pertaining to the triggered rule;
    generating a pseudo security event from received data about known attacks and related indicators of compromise; and
    processing the pseudo security events by sequentially applying the rules, wherein processing the pseudo security events comprises:
        increasing a current rule counter of pseudo security events relating to the triggered rule which processing has triggered the offense, and
        increasing a current indicator of compromise counter for pseudo security events pertaining to the triggered rule,
    sorting the rules in the rule index according to a rule likelihood of triggering an offense, wherein the sorting the rules is based on respective weighted rule counter values, and
    sorting, for each rule, the indicators of compromise in the respective indicator of compromise index according to an indicator of compromise likelihood of triggering an offense, wherein the sorting the indicators of compromise is based on weighted current indicator of compromise counter values.

2. The method according to claim 1, wherein the sorting the rules also comprises:
    determining the weighted rule counter values by combining weighted past rule counter values and weighted current rule counter values of the rule.

3. The method according to claim 1, wherein the sorting, within each rule, the indicators of compromise also comprises:
    determining the weighted indicator of compromise counter values by combining weighted past indicator of compromise value counter values and weighted current indicator of compromise counter values of the respective indicator of compromise.

4. The method according to claim 1, wherein the rule incrementation step also comprises:
increasing the current rule counter by a fixed number or by a number indicative of a severity of the offense.

5. The method according to claim 1, wherein the increasing the current indicator of compromise counter also comprises:
increasing the current indicator of compromise counter by a fixed number.

6. The method according to claim 1, wherein the generating the pseudo security event comprises:
applying a tactic-technique-procedure (TTP) identifying data from the received data about known attacks, wherein the received data about known attacks are received via a structured threat information expression (STIX) protocol.

7. The method according to claim 1, wherein the generating the pseudo security event comprises:
generating a pseudo security event for each phase of a sequence of partial cyber-attacks represented by attack patterns.

8. The method according to claim 1, wherein the generating the pseudo security event comprises:
generating a pseudo security event for each indicator of compromise relating to a respective rule.

9. The method according to claim 1, where the generating a pseudo security event also comprises:
resetting the current rule counter of pseudo security events to zero; and
resetting the current indicator of compromise counter for pseudo security events to zero.

10. The method according to claim 1, wherein the sorting the rules in the rule index comprises:
determining the weighted rule counter $RC_w$ by:

$$RC_w = P*\text{past rule counter} + (w_1*\text{observed events}) + (w_2*\text{pseudo security events}),$$

wherein P=predefined percentage value, $w_1$, $w_2$=predefined weighing factor values, past rule counter is a number of offenses counted previously, observed events is a counter of offenses generated in a current time window for real events, and pseudo security events is a counter of offenses generated in the current time window for pseudo events.

11. The method according to claim 1, also comprising:
buffering the incoming security event after a predetermined first number of rules have been processed and within each processed rule a predetermined second number of indicator of compromise counter groups have been processed; and
continue the processing of the buffered security event if a processing load of incoming security events decreases below a predefined load threshold value.

12. A SIEM system for processing security events by applying a rule-based alarm scheme for determining whether a received security event is considered as offense, the system comprising:
a processor;
one or more computer readable storage medium; and
program instructions stored on the one or more computer readable storage medium, the program instructions being executable by the processor to:
generate a rule index of rules, the rules to be applied when receiving an incoming security event, and generate a respective indicator of compromise index for each of the rules, each respective indicator of compromise index comprising indicator values of indicators of compromise to be used for a comparison against an attribute of a security event;
process the incoming security event by sequentially applying the rules;
increase a current rule counter relating to a triggered rule, wherein the triggered rule comprises a respective one of the rules that triggered an offense during the processing, and increase a current indicator of compromise counter pertaining to the triggered rule; and
generate a pseudo security event from received data about known attacks and related indicators of compromise, and process the pseudo security events by sequentially applying the rules, wherein the processing the pseudo security events comprises:
increasing, by a pseudo security event counter module, a current rule counter of pseudo security events relating to the triggered rule which processing has triggered the offense, and
increasing, by a counter for indicator of compromise for pseudo security events, a current indicator of compromise counter for pseudo security events pertaining the triggered rule, and
sort the rules in the rule index according to a rule likelihood of triggering an offense, wherein the sorting the rules is based on respective weighted rule counter values, and
sort, for each rule, the indicators of compromise in the respective indicator of compromise index according to an indicator of compromise likelihood of triggering an offense, wherein the sorting the indicators of compromise is based on weighted indicator of compromise counter values.

13. The system according to claim 12, wherein the program instructions are executable by the processor to determine the weighted rule counter values by combining a weighted past rule counter and a weighted current rule counter of the rule.

14. The system according to claim 12, wherein the program instructions are executable by the processor to determine the weighted indicator of compromise counter values by combining a weighted past indicator of compromise counter and a weighted current indicator of compromise counter of the respective indicator value.

15. The system according to claim 12, wherein the program instructions are executable by the processor to increase the current rule counter by a fixed number or by a number indicative of a severity of the offense.

16. The system according to claim 12, wherein the program instructions are executable by the processor to increase the current indicator of compromise counter by a fixed number.

17. The system according to claim 12, wherein the program instructions are executable by the processor to apply tactic-technique-procedure (TTP) identifying data from the received data about known attacks, wherein the received data about known attacks are received via a structured threat information expression (STIX) protocol.

18. The system according to claim 12, wherein the program instructions are executable by the processor to generate a pseudo security event for each phase of a sequence of partial cyber-attacks represented by attack patterns.

19. The system according to claim 12, wherein the program instructions are executable by the processor to generate security event for each indicator of compromise relating to a respective rule.

20. The system according to claim 12, wherein the program instructions are executable by the processor to reset the current rule counter of pseudo security events to zero, and reset the current indicator of compromise counter for pseudo security events to zero.

21. The system according to claim 12, wherein the program instructions are executable by the processor to determine the weighted rule counter $RC_w$ by:

$$RC_w = P*\text{past rule counter} + (w_1*\text{observed events}) + (w_2*\text{pseudo security events}),$$

wherein P=predefined percentage value, $w_1$, $w_2$=predefined weighing factor values, past rule counter is a number of offenses counted previously, observed events is a counter of offenses generated in a current time window for real events, and pseudo security events is a counter of offenses generated in the current time window for pseudo events.

22. The system according to claim 12, further comprising:
an intermediate storage adapted for buffering the incoming security event after a predetermined first number of rules have been processed and within each processed rule a predetermined second number of indicator value groups have been processed, and also adapted for triggering a continuation of the processing of the buffered security event when a processing load of incoming security events decreases below a predefined load threshold value.

23. A computer program product for processing security events by applying a rule-based alarm scheme for determining whether a received security event is considered as offense, the computer program product comprising:
one or more computer readable storage medium and program instructions stored on at least one of the one or more computer readable storage medium, the program instructions executable by a processor, the program instructions comprising:
program instructions to generate a rule index of rules, the rules to be applied when receiving an incoming security event;
program instructions to generate a respective indicator of compromise index for each of the rules, each respective indicator of compromise index comprising indicator values of indicators of compromise to be used for a comparison against an attribute of a security event;
program instructions to process the incoming security event by sequentially applying the rules;
program instructions to increase a current rule counter relating to a triggered rule, wherein the triggered rule comprises a respective one of the rules that triggered an offense during the processing;
program instructions to increase a current indicator of compromise counter pertaining to the triggered rule;
program instructions to generate a pseudo security event from received data about known attacks and related indicators of compromise;
program instructions to process the pseudo security events by sequentially applying the rules, wherein the processing comprises:
program instructions to increase a current rule counter of pseudo security events relating to the triggered rule which processing has triggered the offense, and
program instructions to increase a current indicator of compromise counter for pseudo security events pertaining to the triggered rule;
program instructions to sort the rules in the rule index according to a rule likelihood of triggering an offense, wherein the sorting the rules is based on respective weighted rule counter values; and
program instructions to sort, for each rule, the indicators of compromise in the respective indicator of compromise index according to an indicator of compromise likelihood of triggering an offense, wherein the sorting the indicators of compromise is based on weighted indicator of compromise counter values.

\* \* \* \* \*